H. W. GLANZ, Jr.
STOCK FOUNTAIN.
APPLICATION FILED OCT. 27, 1915.

1,193,683.

Patented Aug. 8, 1916.

INVENTOR
Henry W. Glanz Jr.
by
Owen, Owen & Crampton

UNITED STATES PATENT OFFICE.

HENRY W. GLANZ, JR., OF NAPOLEON, OHIO.

STOCK-FOUNTAIN.

1,193,683. Specification of Letters Patent. Patented Aug. 8, 1916.

Application filed October 27, 1915. Serial No. 58,209.

*To all whom it may concern:*

Be it known that I, HENRY W. GLANZ, Jr., a citizen of the United States, and a resident of Napoleon, in the county of Henry and State of Ohio, have invented a certain new and useful Stock-Fountain; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to water troughs for stock.

It particularly relates to a trough wherein a source of water supply is allowed to be fed into the trough as fast as it is used by the stock, and yet wherein all of the parts may be kept clean and sanitary.

One of the objects of the invention is to provide a means for regulating the flow of water from any form of a container which may be readily obtained and which will automatically feed the water to any form of a trough which is in common use.

The constructions containing the invention may be greatly varied. To illustrate the practicability of constructions containing the invention, I have selected one as an example and shall describe it hereinafter. The construction selected is illustrated in the accompanying drawings.

Figure 1:
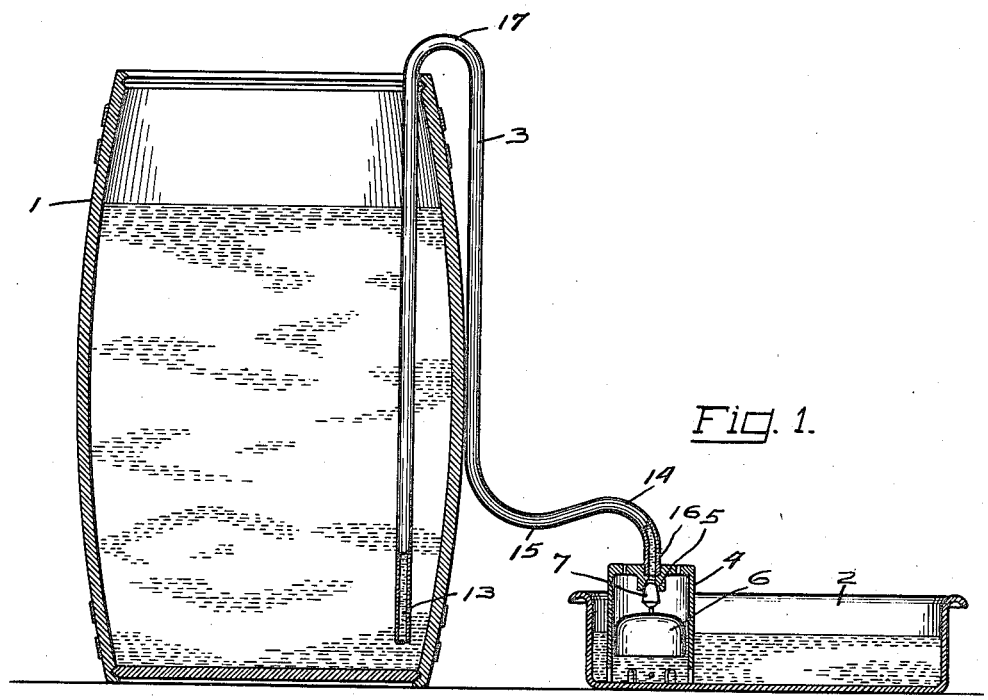
Figure 2:
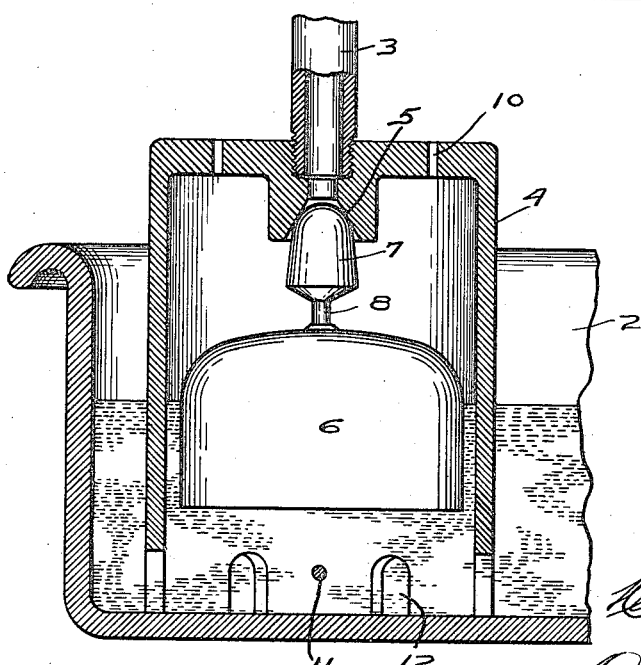

Figure 1 of the drawings illustrates a sectional view of the source of supply, the trough and the automatic means for regulating the flow of the water from the source of supply to the trough. Fig. 2 illustrates a view on a larger scale than that used in Fig. 1, to show the float and valve for regulating the flow of the water.

1, Fig. 1, may be any form of a source of supply. It may be located in the vicinity of the water trough, or it may be located remote therefrom. 2 is the watering trough which receives the water from the source of supply 1. In the figure, I have shown a barrel as a source of supply, and a pan for a watering trough. The parts, however, may be made of cement, or any form of construction that may be found convenient. A pipe 3 is bent to form a siphon. It extends from near the bottom of the source of water supply, such as the barrel 1 and to and above the trough 2. The pipe is connected to a cylinder 4, forming an inverted cup, the pipe being connected to the bottom of the inverted cup. The cup 4 is provided with an inverted socket 5. A float 6 of any suitable construction is located in the cylinder 4, sufficient space being left, however, between the sides of the float 6 and the cylinder 4 to allow the water to raise the float and prevent any capillary action on the surface of the float to hold it down so as to prevent its rising by reason of its buoyancy.

The upper end of the float 6 is provided with a movable valve member 7 which fits into the socket 5. The inner surface of the socket 5 is preferably frusto-conical, so that the valve 7 will seat itself in the socket 5 and close it. The pipe 3 communicates through the socket 5 with the interior of the cylinder 4 so that when the float 6 is raised, the valve 7 will enter the socket 5 and prevent further flow of the water 3, the upward pressure on the valve 7 produced by the buoyancy of the float 6 being sufficient to overcome the downward pressure of the water on the pipe 3 by reason of the location of the socket 5 relative to the height of the water in the barrel 1. The valve member 7 is preferably of rubber. It is rounded at its upper end so as to the better seal the inlet and prevent the water from flowing when the float is raised. The valve member 7 is located on a pin 8, to which it is secured. The pin 8 is secured to the top of the float 6.

The pipe 3 above the float and its container is provided with a double bend, as at 14 and 15. The S-bend in the pipe prevents air that may enter the end 16 of the pipe, to which the cylinder 4 is connected, from passing to the bend 17 located above the source of supply which might prevent siphonic action of the pipe. The air will be collected in the pipe at the bend 14.

The cylinder 4 is provided with one or more openings 10 to permit the air to escape and to allow the float 6 to rise within the cylinder 4. A pin 11 may be inserted in the lower end of the cylinder 4 to limit the downward movement of the float 6 when the water is used from the trough 2. The cylinder 4 may also be provided with openings 12 to allow the water to pass from the cylinder 4, and also to keep the level of the water within the cylinder 4 the same as that within the trough 2, in which the cylinder is located, the object being to form a passageway from the cylinder to the trough from beneath the float 6.

In the use of the stock fountain, the siphon 3 is filled with water. This may be done by picking up the pipe 3 and the cylinder 4 and inverting it in the barrel 1, closing the end 13 of the pipe with the fingers until the end 13 of the pipe 3 is again inserted in the water of the barrel, after the manner well known, and then placing the cylinder 4 in the trough 2. In this operation, air will not enter the pipe through the end 16 to any material extent on account of the double bend at 14 and 15.

The construction selected and described may be greatly modified in the arrangement and manufacture of its parts and in the substitution of elements having equivalent functions, and still contain the invention.

Having thus described my invention, what I claim as new, and desire to secure by Letters Patent, is—

1. The combination of a receptacle for containing water, a siphon extending over the edge of the receptacle to near the bottom thereof, a cylinder threaded on to the end of the siphon located without the receptacle and having an opening registering with the passage-way through the siphon, a cylinder having a valve seat surrounding the opening, a float substantially fitting the interior of the cylinder and guided by the wall of the cylinder, a valve member located centrally on the top of the float for registering with the valve seat and closing the said opening when the float is raised, a container for water for receiving the cylinder.

2. The combination of a receptacle for containing water, a siphon extending over the edge of the receptacle to near the bottom thereof, a weighted cylinder threaded on to the end of the siphon located without the receptacle for supporting the siphon in an upright position and having an opening registering with the passage-way through the siphon, a cylinder having a valve seat surrounding the opening, a float substantially fitting the interior of the cylinder and guided by the wall of the cylinder, a valve member located centrally on the top of the float for registering with the valve seat and closing the said opening when the float is raised, a container for water for receiving the cylinder.

3. The combination of a receptacle for containing water, a siphon extending over the edge of the receptacle to near the bottom thereof, a weighted cylinder threaded on to the end of the siphon located without the receptacle for supporting the siphon in an upright position and having an opening registering with the passage-way through the siphon, a cylinder having a valve seat surrounding the opening, a float substantially fitting the interior of the cylinder and guided by the wall of the cylinder, a valve member located centrally on the top of the float for registering with the valve seat and closing the said opening when the float is raised, a container for water for receiving the cylinder, the siphon having near its outer end an S-curve for preventing the escape of water and the entrance of air into the siphon above the edge of the first-named receptacle.

In testimony whereof, I have hereunto signed my name to this specification.

HENRY W. GLANZ, Jr.